United States Patent
Angelin

(10) Patent No.: US 10,447,168 B2
(45) Date of Patent: Oct. 15, 2019

(54) ELECTRONIC CONVERTER AND RELATED METHOD OF OPERATING AN ELECTRONIC CONVERTER

(71) Applicant: OSRAM GmbH, Munich (DE)

(72) Inventor: Francesco Angelin, Mogliano Veneto (IT)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/761,849

(22) PCT Filed: Sep. 16, 2016

(86) PCT No.: PCT/IB2016/055537
§ 371 (c)(1),
(2) Date: Mar. 21, 2018

(87) PCT Pub. No.: WO2017/051295
PCT Pub. Date: Mar. 30, 2017

(65) Prior Publication Data
US 2018/0234021 A1   Aug. 16, 2018

(30) Foreign Application Priority Data
Sep. 22, 2015 (IT) .......................... 102015000053942

(51) Int. Cl.
*H02M 3/335* (2006.01)
*H05B 33/08* (2006.01)
*H02M 1/00* (2006.01)

(52) U.S. Cl.
CPC ... *H02M 3/33561* (2013.01); *H02M 3/33569* (2013.01); *H05B 33/0815* (2013.01);
(Continued)

(58) Field of Classification Search
CPC .......... H02M 3/1584; H02M 3/33561; H02M 3/33569; H02M 2001/0083; H02M 2001/0048; H05B 33/0815
See application file for complete search history.

(56) References Cited

U.S. PATENT DOCUMENTS 6,977,447 B2 *  12/2005  May .......................... H02J 1/10
                                                         307/31
7,372,239 B2 *   5/2008  Kumagai .............. H02M 3/158
                                                        323/206
(Continued)

FOREIGN PATENT DOCUMENTS

EP         0698959 A1    2/1996
WO     2009020985 A1    2/2009

OTHER PUBLICATIONS

International Search Report based on application No. PCT/IB2016/055537 (12 pages) dated Nov. 17, 2016 (for reference purpose only).

*Primary Examiner* — Kyle J Moody
(74) *Attorney, Agent, or Firm* — Viering Jentschura & Partner MBB

(57) ABSTRACT

An electronic converter comprising a switching stage comprising at least one electronic switch, wherein the switching stage is adapted to provide a current via a terminal; a first capacitor, wherein the first capacitor provides a first voltage. Specifically, converter further comprises: a second capacitor, wherein the second capacitor provides a second voltage, comparison means configured to detect the difference between the first voltage and the second voltage, and determine a comparison signal which indicates whether this difference is greater than a threshold, and switching means configured to transfer selectively current to the first capacitor or the second capacitor as a function of the comparison signal.

12 Claims, 10 Drawing Sheets

(52) U.S. Cl.
CPC ............... *H02M 2001/0009* (2013.01); *H02M 2001/0048* (2013.01); *H02M 2001/0083* (2013.01)

(56) References Cited

U.S. PATENT DOCUMENTS

| | | | | |
|---|---|---|---|---|
| 8,049,472 B2* | 11/2011 | Easwaran | ............ | H02M 3/158 323/267 |
| 8,773,088 B2* | 7/2014 | Menegoli | ............ | H02M 3/158 323/267 |
| 9,225,245 B2* | 12/2015 | Miyamae | ............ | H02M 3/158 |
| 9,787,184 B2* | 10/2017 | Wang | ...................... | H02M 1/32 |
| 9,793,800 B1* | 10/2017 | Yan | ..................... | H02M 3/1584 |
| 2002/0093315 A1* | 7/2002 | Sluijs | ................... | H02M 3/158 323/267 |
| 2009/0039711 A1* | 2/2009 | Williams | ............ | H02M 3/1584 307/113 |
| 2013/0002214 A1* | 1/2013 | Chiu | .................. | H02M 3/1584 323/271 |
| 2013/0082668 A1* | 4/2013 | Tseng | ................... | H02M 3/158 323/267 |
| 2018/0138815 A1* | 5/2018 | Yamada | ................ | H02M 3/158 |
| 2018/0183337 A1* | 6/2018 | Huang | ................ | H02M 3/1582 |

* cited by examiner

ELECTRONIC CONVERTER AND RELATED METHOD OF OPERATING AN ELECTRONIC CONVERTER

CROSS-REFERENCE TO RELATED APPLICATION

The present application is a national stage entry according to 35 U.S.C. § 371 of PCT application No.: PCT/IB2016/055537 filed on Sep. 16, 2016, which claims priority from Italian Patent Application Serial No.: 102015000053942 which was filed Sep. 22, 2015, and is incorporated herein by reference in its entirety.

TECHNICAL FIELD

The description relates to electronic converters.

The description was devised with particular attention paid to the implementation of electronic converters providing a plurality of voltages.

BACKGROUND

Electronic converters for light sources, comprising e.g. at least one LED (Light Emitting Diode) or other solid-state lighting means, may offer a direct current output. Such current may be steady or vary in time, e.g. in order to adjust the brightness emitted by the light source (so-called dimming function).

FIG. 1 shows a possible lighting arrangement comprising an electronic converter 10 and a lighting module 20 including, e.g., at least one LED L.

For instance, FIG. 2 shows an example of a lighting module 20 comprising an LED chain, i.e. a plurality of LEDs connected in series. As an example, FIG. 2 shows four LEDs L1, L2, L3 and L4.

Electronic converter 10 may comprise a control circuit 102 and a power circuit 12 (e.g. an AC/DC or DC/DC switching power supply) which receives at an input, a supply signal (e.g. from the mains) and provides at an output, via a power output 106, a voltage $V_O$. Such a voltage may be steady or vary in time. E.g., control circuit 102 may set, via a reference signal $V_{ref}$ of power circuit 12, the voltage provided at output 106 for feeding lighting module 20. Lighting module 20 may include a current regulator 22, connected in series with light sources L for limiting the current.

There are many types of electronic converters, such as for example "buck", "boost", "buck-boost", "flyback" or "forward" converters.

FIG. 3 shows the circuit diagram of a flyback converter 12, wherein a lighting module 20 is connected to output 106 of converter 12.

A flyback converter comprises a transformer T with a primary winding T1 and a secondary winding T2, an electronic switch S, such as an n-channel MOSFET (Metal-Oxide-Semiconductor Field-Effect Transistor), a rectification diode D and an output capacitor C.

Specifically, transformer T may be modelled as an inductor Lm connected in parallel with primary winding T1, which represents the magnetising inductance of transformer T, and an ideal transformer with a given ratio of the numbers of turns 1:n.

Converter 12 receives at input, via two input terminals 110, a voltage $V_{in}$ and provides at output, via two output terminals 106, a regulated voltage $V_o$. Voltage $V_{in}$ may also be obtained from an AC input current, for instance via a rectifier, e.g. a diode-bridge rectifier, and optionally via a filter capacitor.

The first input terminal (positive terminal) is connected to the first terminal of primary winding T1 of transformer T, and the second input terminal (negative terminal) represents a first ground $GND_1$. On the other hand, the second terminal of primary winding T1 of transformer T is connected via switch S to ground $GND_1$. Therefore, switch S may be used for activating selectively the current flow through primary winding T1 of transformer T.

In a flyback converter, secondary winding T2 of transformer T is connected via a diode D to an output capacitor C. Specifically, the first terminal of rectification winding T2 is connected to the anode of diode D, and the cathode of diode D is connected to a first output terminal (positive terminal). On the other hand, the second terminal is connected directly to the second output terminal (negative terminal), which represents a second ground $GND_2$, which due to the insulating effect of transformer T is preferably different from ground $GND_1$ and therefore is denoted with a different ground symbol.

Finally, capacitor C is connected in parallel with output 106.

As a consequence, when switch S is closed (first operating interval), primary winding T1 of transformer T is connected directly to input voltage $V_{in}$. This causes an increase of the magnetic flux in transformer T. Therefore, the voltage across secondary winding T2 is negative and diode D is reverse biased. In this condition, output capacitor C provides the energy required by lighting module 20.

On the other hand, when switch S is opened (second operating interval), the energy stored in transformer T is transferred as flyback current to the secondary side.

Typically, both operating intervals are repeated periodically. For example, a converter normally also comprises a driver circuit 112, controlling the switching of switch S as a function of a feedback signal. For example, such driver circuit 112 may be designed for repeating the operating intervals at a fixed frequency, wherein the energy transfer is controlled via a PWM signal, i.e. the durations of the first and of the second time intervals are variable, while the sum of the durations is constant. Such PWM driving and the control of the durations of the operating intervals are well known and that they can be implemented e.g. via a feedback of the output voltage via an error amplifier. For example, in the case of a voltage control, the duration of the first time interval is increased until the (average) output voltage corresponds to a desired value.

An electronic converter is often required to generate a plurality of voltages. For example, this may be useful for generating a supply for the control circuit 102 and/or for the driver circuit 112.

For example, FIGS. 4 and 5 show various solutions of multiple output supplies, having e.g. two outputs 106a and 106b, by resorting again e.g. to a flyback topology.

In the diagram of FIG. 4, transformer T is provided with two secondary windings T2a and T2b (a winding for each output 106a and 106b). Moreover, on the secondary side for each secondary winding T2a and T2b there is provided a rectification/filter network of a typical flyback converter, respectively including a diode Da/Db and a capacitor Ca/Cb. Therefore, a way to obtain multiple outputs consists in arranging several windings on the same transformer.

The solution according to FIG. 5, on the other hand, provides one secondary winding T2 and derives the auxiliary output(s) (e.g. output 106b) from main output 106a via an additional converter 12b.

For example, such converter 12b may be a switching converter, such as e.g. a buck converter. This solution is efficient in energy consumption, but requires a number of additional components. Therefore, it is a costly solution and it is rather bulky, especially with reference to its use for generating an auxiliary low-power supply.

Generally speaking, converter 12b may also be implemented via a linear regulator. This solution is simple and may be implemented easily with a low number of components, but has the drawback of a high dissipation of the linear regulator, so that the possible application field is restricted to situations wherein the voltage difference and the current supplied at output are low.

SUMMARY

The present description aims at overcoming the previously outlined drawbacks. Specifically, it has been observed that it would be useful to derive a plurality of outputs at different voltages from one switching converter, without the addition of further magnetic components or the arrangement thereon of multiple plugs, and without the addition of further switching regulators or linear regulators.

The present description relates to a converter which provides a plurality of voltages.

In various embodiments, the electronic converter may comprise a switching stage with at least one electronic switch which provides a current via a terminal. The other output terminal typically represents a ground. The converter moreover comprises a first and a second capacitor, which may be charged by the current and which respectively provide a first and a second voltage.

In various embodiments, the converter may comprise comparison means for detecting the difference between the first and the second voltage. Such comparison means moreover determine a comparison signal indicating whether the difference is greater than a given threshold. For example, the comparison means may be implemented via a comparator, e.g. a comparator with hysteresis or a Zener diode.

In various embodiments, the converter may moreover comprise switching means, which are interposed between the terminal providing the current and the capacitors. Specifically, such switching means are provided for transferring selectively the current to the first or to the second capacitor as a function of the comparison signal. For example, the switching means may be implemented via a diode and an electronic switch. Such a diode may accord that the first capacitor does not discharge towards the second capacitor. Such a diode may be also implemented as a rectification diode of the switching stage, e.g. the rectification diode of a boost or a flyback converter.

Specifically, in various embodiments, the switching stage provides current pulses, i.e. at given instants the supplied current is equal to zero. In this case, the operation of the switching means is preferably synchronized with such current pulses.

For example, in various embodiments the switching means include a current sensor and a detection circuit, which detects a signal indicating whether the current is equal to zero. In this case, the switching means may transfer selectively the current pulses to the first or to the second capacitor also as a function of such a signal. For example, in various embodiments, the switching means may comprise a latch or a flip-flop, so that a current pulse may be transferred completely to the first capacitor when the voltage difference is smaller than the threshold. On the contrary, a current pulse is transferred completely to the second capacitor when the voltage difference is greater than the threshold.

In other embodiments, the switching means may be implemented via an SCR which is connected between the terminal providing the current pulses and the second capacitor. In this case, the SCR trigger may be driven by a Zener diode, which is connected between the first capacitor and the SCR gate. For example, if the SCR has a low critical rate of rise, every current pulse will be again transferred completely to the first or to the second capacitor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings in which:

FIG. 18 shows an embodiment with three outputs.

DETAILED DESCRIPTION

In the following description, numerous specific details are given to provide a thorough understanding of the embodiments. The embodiments can be practiced without one or more of the specific details, or with other methods, components, materials, etc. In other instances, well-known structures, materials, or operations are not shown or described in detail to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only and do not interpret the extent of protection or scope of the embodiments.

In the following FIGS. 6 to 18, the parts, elements or components which have already been described with reference to FIGS. 1 to 6 are denoted with the same references previously used in such Figures; the description of such previously described elements will not be repeated in the following, so as not to overburden the present detailed description.

The present description provides solutions for generating an auxiliary voltage in a switching converter.

Figure 1:
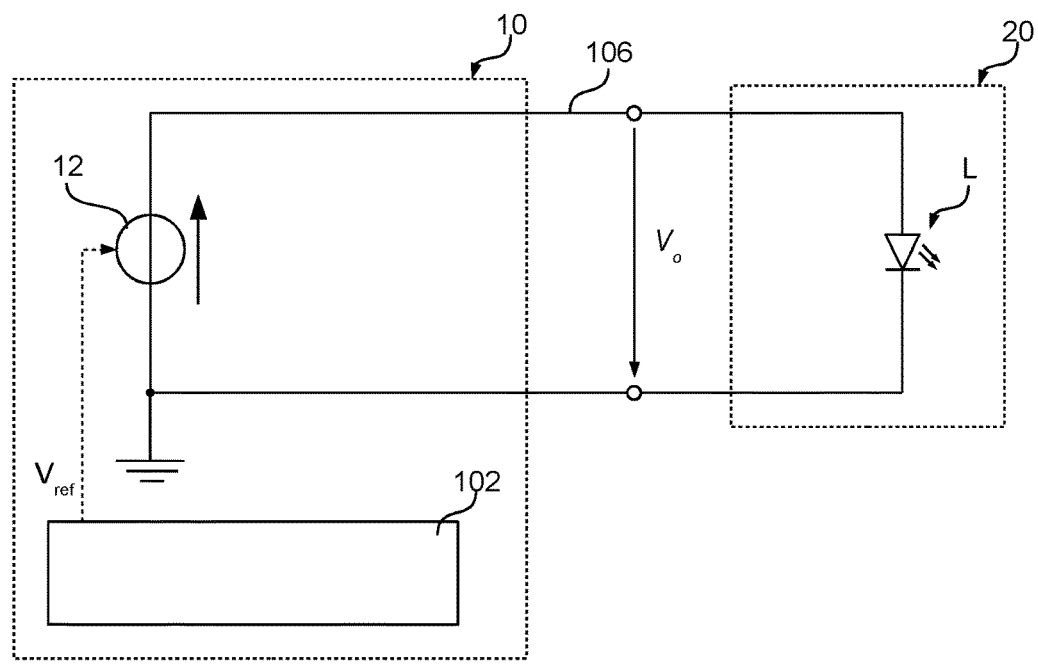
FIGS. 1 to 5 have already been described in the foregoing.
Figure 2:
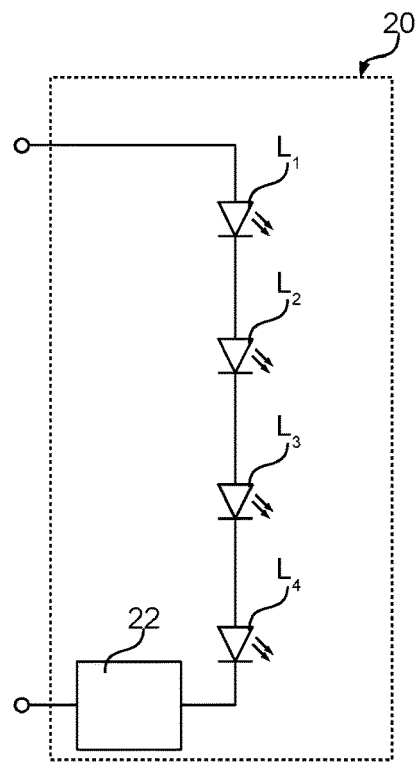
Figure 3:
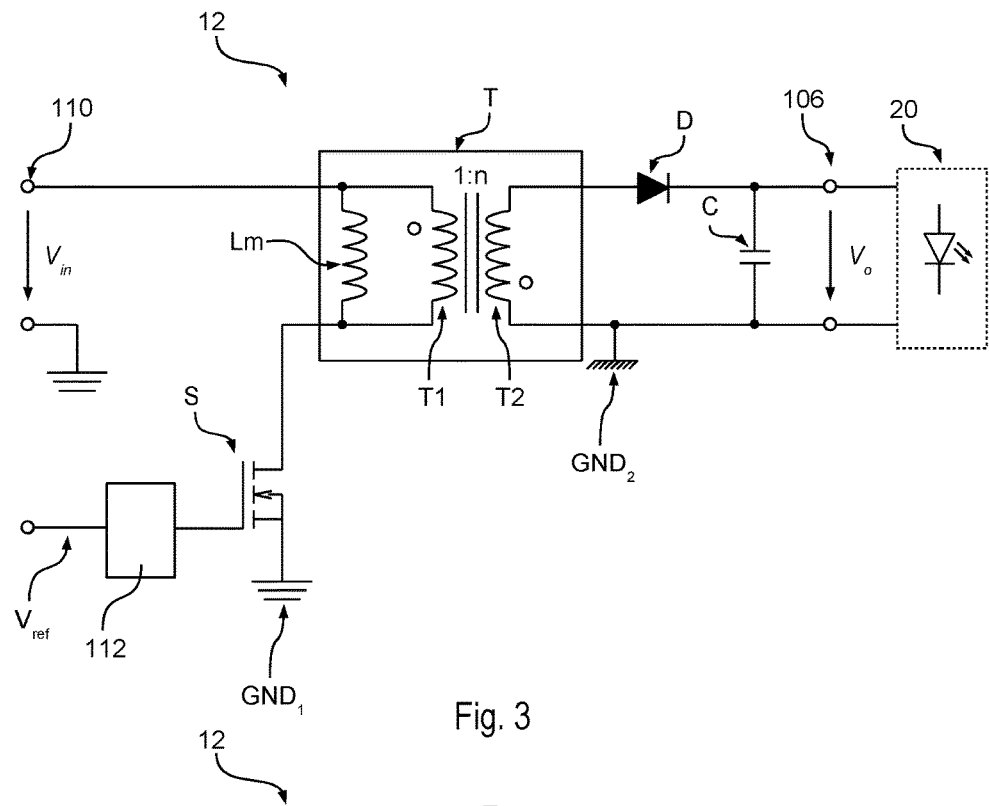
Figure 4:
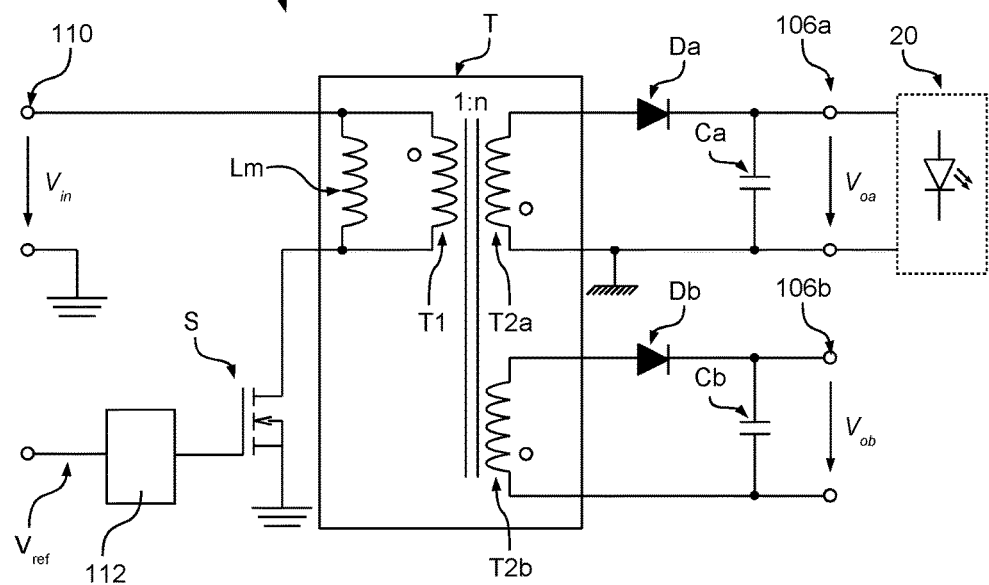
Figure 5:
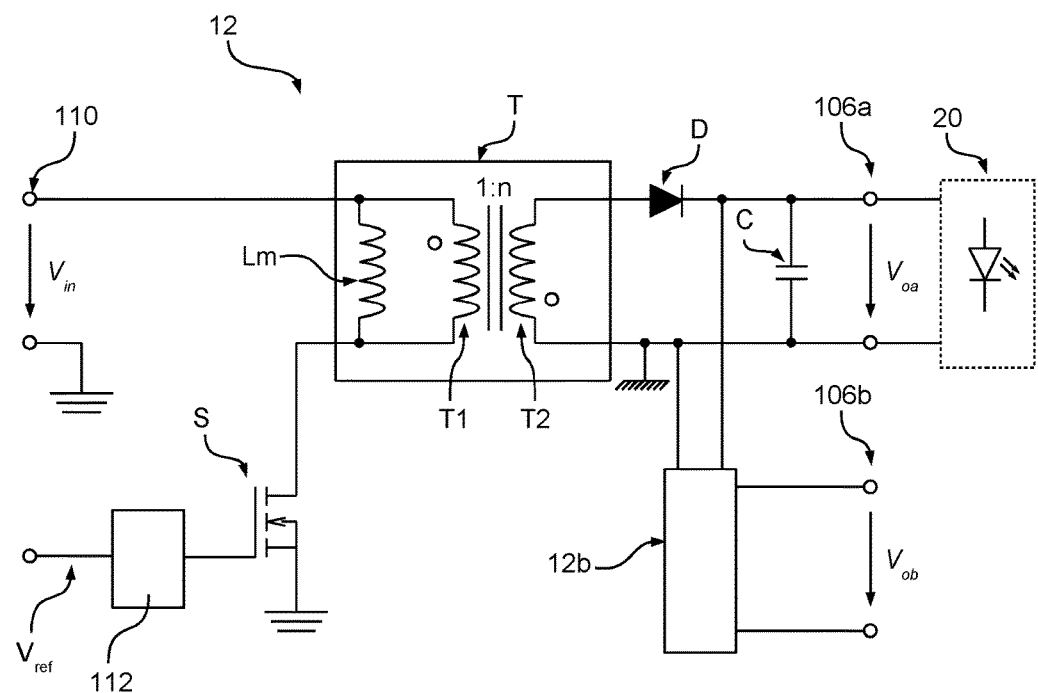
Figure 6:
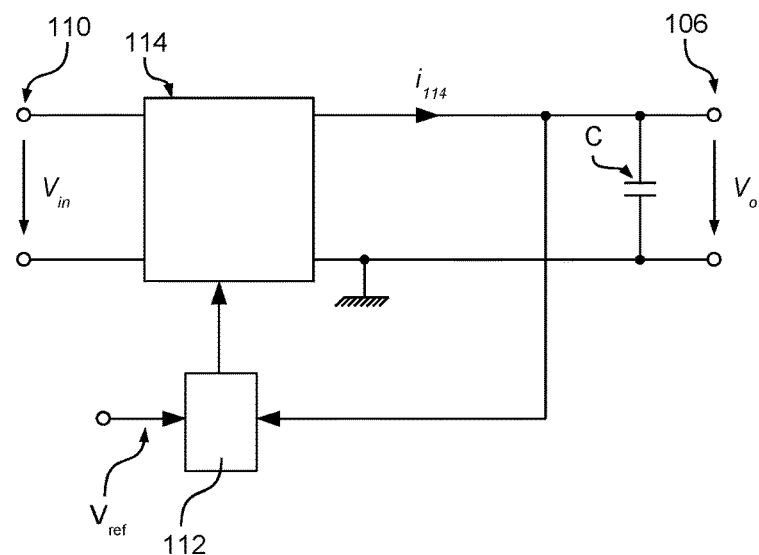
FIG. 6 shows a typical electronic converter with voltage control.

FIG. 6 shows the architecture of a general electronic converter which receives at input, via two input terminals 110, a voltage $V_{in}$, for example a DC voltage, and provides at output, via two output terminals 106, a DC voltage $V_o$.

Converter 12 may include a capacitor C providing voltage $V_o$, i.e. capacitor C is connected (e.g. directly) between both output terminals 106. The converter moreover comprises a switching stage 114, which includes at least an electronic switch, and a driver circuit 112 which drives the at least one electronic switch of stage 114 as a function of output voltage $V_o$. For example, this sort of arrangement is applicable at least to buck, boost, buck-boost, Cuk, SEPIC, ZETA, flyback or forward converters.

Switching stage 114 therefore comprises two output terminals (the first terminal providing a current and the second terminal representing a ground GND), and current $i_{114}$ charges selectively capacitor C, so that voltage $V_o$ across capacitor C corresponds to a desired value.

For example, driver circuit 112 may be a PWM driver circuit, which increases or decreases the duty cycle of at least one driving signal, until output voltage $V_o$ corresponds (in average) to a desired value. Driver circuit 112 may also include a comparator with hysteresis, which activates or deactivates stage 114 when the output voltage respectively reaches an upper or a lower threshold.

Figure 7:
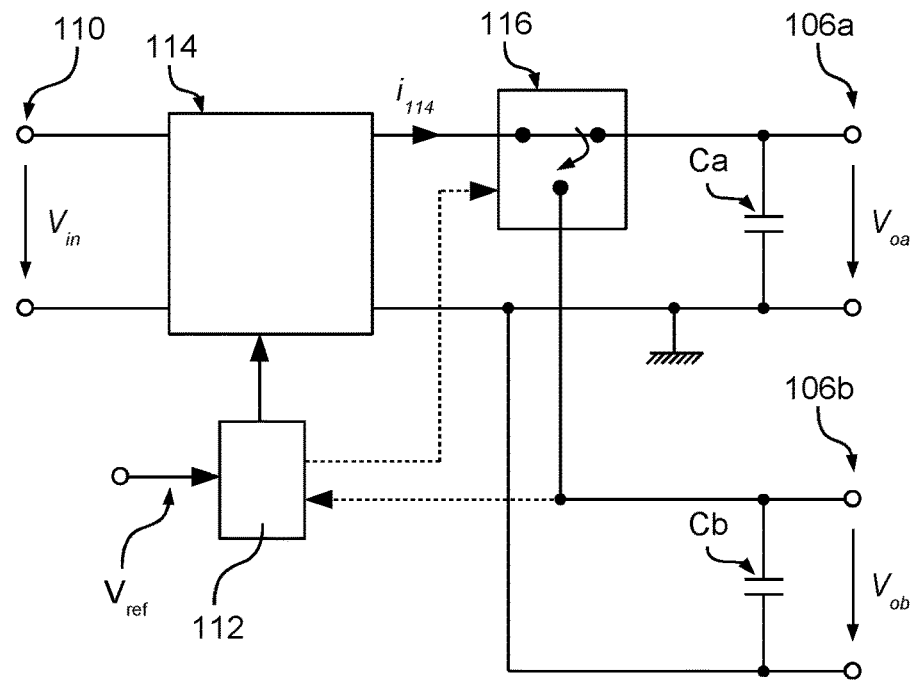
FIG. 7 shows an embodiment of an electronic converter providing two voltages.

FIG. 7 shows a first embodiment of a switching converter which is adapted to generate two voltages. In this embodiment too there is provided a switching stage 114 providing a current $i_{114}$.

For every output 106a and 106b there is provided a respective output capacitor Ca and Cb, respectively providing the output voltages $V_{oa}$ and $V_{ob}$.

Circuit 12 moreover includes switching means 116, which are interposed between switching stage 114 and the various output capacitors Ca/Cb. Specifically, such switching means 116 are adapted to transfer selectively current $i_{114}$ supplied by stage 114 to either output capacitor Ca or Cb.

For example, switching means 116 are implemented by a changeover switch, and driver circuit 112 is adapted to drive the switching of changeover switch 116.

Specifically, driver circuit 112 normally keeps the changeover switch in a first position, wherein current $i_{114}$ is transferred to the first branch, i.e. to capacitor Ca. During this step, control circuit 112 may use voltage $V_{oa}$ across capacitor Ca for driving the switching stage 114.

In various embodiments, control circuit 112 simultaneously monitors voltage $V_{ob}$ of the second branch, i.e. to capacitor Cb, and when voltage falls below a given threshold, driver circuit 112 shifts changeover switch 116 to a second position, wherein current $i_{114}$ is transferred to the second branch, thereby charging capacitor Cb again. During this step, control circuit 112 may therefore use voltage $V_{ob}$ across capacitor Ca for driving switching stage 114.

Therefore, control circuit 112 may be modified in such a way as to enable the use of two feedback signals. However, control circuits are often implemented via integrated circuits, which makes the modification of such circuits costly.

Therefore, in various embodiments, switching means 116 are configured to control directly the transfer of current $i_{114}$ towards capacitor Ca or capacitor Cb.

Figure 8:
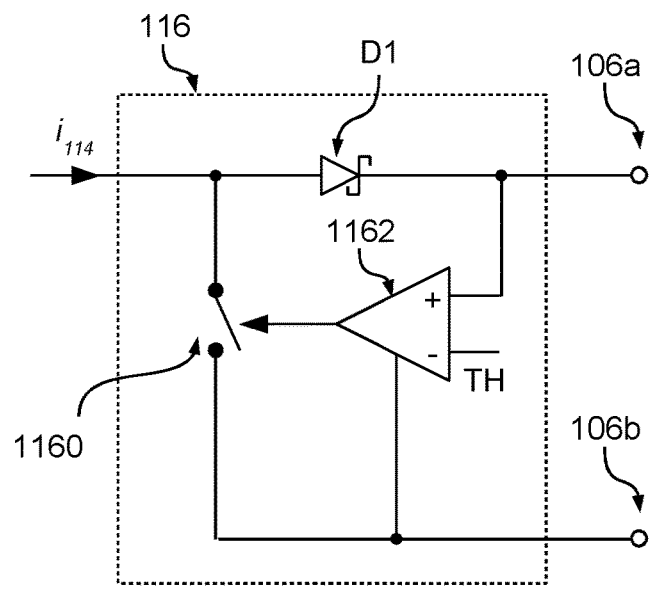
FIGS. 8 to 11 show details of embodiments of the electronic converter of FIG. 7.

FIG. 8 shows a first embodiment of switching means 116. Specifically, output 106a is assumed to provide a voltage $V_{oa}$ which is greater than voltage $V_{ob}$ required for output 106b.

In this case, changeover switch 116 may be implemented via a diode D1, such as e.g. a Schottky diode, and an electronic switch 1160, such as a metal-oxide-semiconductor field-effect transistor (MOSFET). The terminal providing current $i_{114}$ is connected (e.g. directly) to the anode of diode D1, and the cathode of diode D1 is connected (e.g. directly) to a first terminal (positive terminal) of capacitor Ca, associated to output 106a. On the contrary, the second terminal of capacitor Ca is connected (e.g. directly) to ground GND. The terminal which provides current $i_{114}$ is moreover connected, via switch 1160 (e.g. directly) to a first terminal (positive terminal) of capacitor Cb, and the second terminal (negative terminal) of capacitor Cb is connected (e.g. directly) to ground GND.

Diode D1 may accord that capacitor Ca is not discharged towards capacitor Cb. Such diode D1 may also correspond to a rectification diode of switching stage 114. For example, diode D1 may correspond to diode D shown in FIG. 3 for a flyback converter. Such a diode is present, for example, in a boost converter as well.

The switching of switch 1160 may be driven by a comparator 1162, adapted to compare the difference between voltages $V_{oa}$ and $V_{ob}$ with a threshold TH, i.e:
when the difference between voltages is smaller than threshold TH, switch 1160 is opened and current $i_{114}$ charges capacitor Ca, increasing voltage $V_{oa}$, and
when the difference between voltages is greater than threshold TH, switch 1160 is closed and current $i_{114}$ charges capacitor Cb, increasing voltage $V_{ob}$.

In various embodiments, comparator 1162 may be a comparator with hysteresis, so as to reduce the switching frequency of switch 1160.

Therefore, in the embodiment, the difference of voltages $V_{oa}$ and $V_{ob}$ is kept substantially constant, and it is sufficient for the converter to perform a voltage control. Generally speaking, driver circuit 112 may drive switching stage 114 as a function of either voltage $V_{oa}$ or voltage $V_{ob}$. For example, driver circuit 112 is adapted to drive switching stage 114 in such a way as to regulate voltage $V_{ob}$, i.e. the smaller voltage, to the desired value. In this case, voltage $V_{oa}$ is set approximately to $V_{ob}$+TH. The regulation may use the voltage of the output requiring the higher accuracy.

The previously described embodiment is of very easy implementation; however, it has the drawback that the switching of switch 1160 does not take place at zero current.

In this respect, it has been observed that several switching stages 14 have the feature that current $i_{114}$ at the output of switching stage 114 is not continuous but discontinuous, i.e. in some periods it is equal to zero. Such a feature may be intrinsic to the topology of the converter. For example, as described with reference to FIG. 3, in a flyback converter the current provided to secondary winding T2 of the transformer is intrinsically discontinuous. The same is true, for example, for a boost or buck-boost converter, wherein energy is transferred to the output capacitor only during one of the switching cycles. On the contrary, in other converters, the discontinuity may derive from the type of driving. For example, the current provided by a buck converter may be discontinuous, if the buck converter is operated in the Discontinuous Current Mode (DCM). A buck converter typically operates in a discontinuous mode when the load absorbs a low current, and in continuous mode at higher levels of absorbed current.

Figure 9:
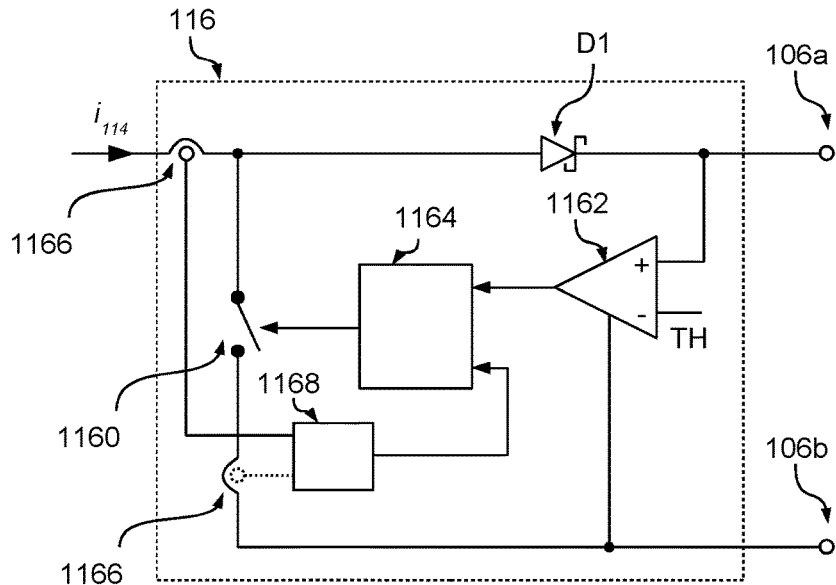

Therefore, in various embodiments, the operation of circuit 116 is synchronized with the switching of switching stage 114, in such a way as to reduce the switching losses of switch 1160. Such synchronization may be obtained by monitoring the driving signal of stage 114 and/or, as shown in FIG. 9, by monitoring a signal identifying current $i_{114}$.

For example, circuit 116 includes a sensor adapted to detect current $i_{114}$ directly at the output of switching stage 112, or to detect another signal identifying such current, e.g. the current flowing through switch 1166.

The signal detected by sensor 1166, such as e.g. a shunt resistor, is supplied to a detection circuit 1168 which determines if the detected current is equal to zero.

In this case, the synchronization with current $i_{114}$ may be obtained via a processing circuit 1164, which determines the driving signal for switch 1160 as a function of the signal provided by comparator 1162 and of the signal provided by the detecting circuit 1168. In the simplest of cases, processing circuit 1164 may be a latch SR. Specifically, in the presently considered embodiment, the signal at the output of comparator 1162 sets latch 1164 to logic level "1" and closes switch 1160 when the voltage difference exceeds threshold TH. On the other hand, the latch is reset when the current detected by circuit 1168 falls to zero again.

In this case, which will be called split pulse mode in the following, an initial part of a current pulse is transferred to output 106a, i.e. the output with the greater voltage, and when comparator 1162 detects that the voltage difference exceeds threshold TH, the second part of the current pulse is transferred to output 106b. As a matter of fact, latch 1164 is reset only when the current detected by sensor 1166 falls to zero again.

For example, FIG. 10a shows a possible profile of current $i_{114}$, FIG. 10b shows the difference of voltages $V_{oa}$ and $V_{ob}$, and FIGS. 10c and 10d respectively show current $i_{D1}$ flowing through diode D1, i.e. the current charging capacitor Ca, and current $i_{1160}$ flowing through switch 1160, i.e. the current charging capacitor Cb.

Specifically, in the presently considered example, there are shown three pulses for current $i_{114}$:
the first pulse is transferred completely to capacitor Ca, because the voltage difference is still smaller than threshold TH;
during the second pulse, the difference between voltages $V_{oa}$ and $V_{ob}$ reaches threshold TH and switch 1160 is closed via latch 1164, and the current is transferred to capacitor Cb from this moment on;
also the third pulse is transferred completely to capacitor Ca, because the voltage difference is still smaller than threshold TH.

This embodiment offers the advantage that output voltages $V_{oa}$ and $V_{ob}$ have only a reduced ripple, because both capacitors Ca and Cb may be charged at each current pulse. However, this embodiment has the disadvantage that the closing of switch 1160 does not take place at zero current, i.e. only the opening is synchronized with current $i_{114}$.

For this reason, circuit 1164 may be configured for transferring each current pulse completely to one of capacitors Ca or Cb, which will be named full pulse mode in the following. For example, this may obtained via a circuit 1164 which includes a latch D, wherein the signal provided by comparator 1162 is only sampled when current $i_{114}$ is equal to zero, i.e. the signal provided by circuit 1168 may be used as an enablement signal of said latch.

For example, FIG. 11a shows a possible profile of current $i_{114}$, FIG. 11b shows the difference between voltages $V_{oa}$ and $V_{ob}$, and FIGS. 11c and 11d respectively show current $i_{D1}$ flowing through diode D1, i.e. the current charging capacitor Ca, and current $i_{1160}$ flowing through switch 1160, i.e. the current charging capacitor Cb.

Specifically, also in this example there are shown three pulses for current $i_{114}$:
the first pulse is transferred completely to capacitor Ca, because at the beginning of the pulse the difference between voltages $V_{oa}$ and $V_{ob}$ is smaller than threshold TH;
at the beginning of the second pulse, the difference of voltages $V_{oa}$ and $V_{ob}$ is greater than threshold TH, and the current is transferred to capacitor Cb only;
also the third pulse is transferred completely to capacitor Ca, because at the beginning of the pulse the difference of voltages $V_{oa}$ and $V_{ob}$ is smaller than threshold TH.

This embodiment offers the advantage that both the closing and the opening of switch 1160 take place at zero current. However, this embodiment has the disadvantage that the output voltages have a higher ripple, which is also visible in FIG. 11b.

Figure 12:
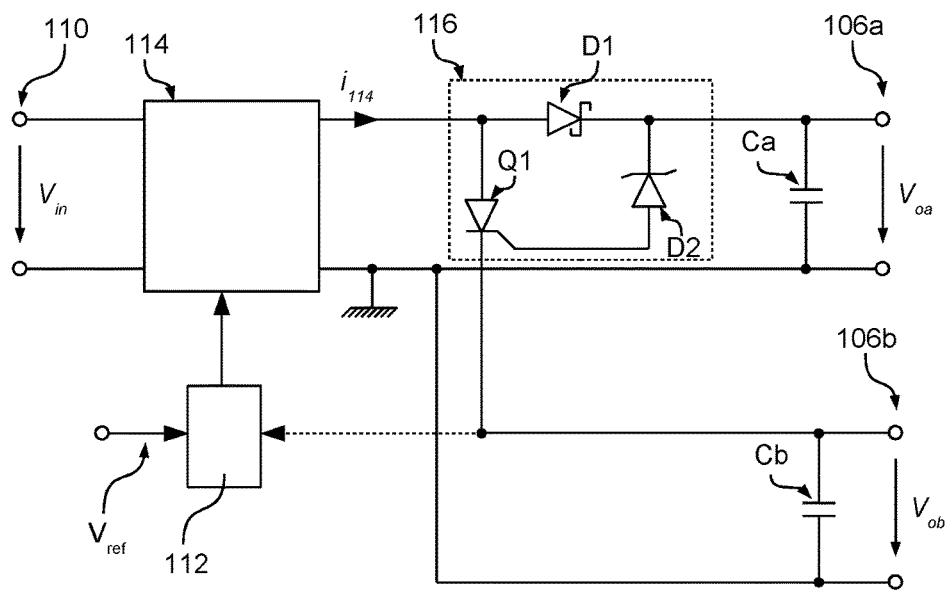
FIG. 12 shows a second embodiment of an electronic converter providing two voltages.

FIG. 12 shows a second embodiment of switching means 116, wherein the use of a dedicated latch or flip-flop is not required.

For example, switching means 116 are implemented via diode D1, e.g. a Schottky diode, an SCR (Silicon Controlled Rectifier) Q1 and a Zener diode D2.

Specifically, the terminal providing current $i_{114}$ is connected (e.g. directly) to the anode of diode D1, and the cathode of diode D1 is connected (e.g. directly) to a first terminal (positive terminal) of capacitor Ca associated with output 106a. On the other hand, the second terminal of capacitor Ca is connected (e.g. directly) to ground GND. The terminal which provides current $i_{114}$ is moreover connected, via SCR Q1, to capacitor Cb associated to output 106b. Specifically, the terminal providing current $i_{114}$ is connected (e.g. directly) to the anode of SCR Q1, and the cathode of SCR Q1 is connected (e.g. directly) to a first terminal (positive terminal) of capacitor Cb. On the other hand, the second terminal of capacitor Cb is connected (e.g. directly) to ground GND. Finally, the gate of SCR Q1 is connected via Zener diode D2 to the positive terminal of capacitor Ca, associated to output 106a. Specifically, the anode of Zener diode D2 is connected (e.g. directly) to the gate of SCR Q1, and the cathode of Zener diode D2 is connected (e.g. directly) to the cathode of diode D1.

Therefore, output 106a provides a voltage $V_{oa}$ which is greater than voltage $V_{ob}$ provided at output 106b, and the difference between the voltages is set via the Zener voltage Vz of diode D2 (and the gate voltage of SCR Q1). As a matter of fact, when a trigger signal is applied to the gate of SCR Q1, i.e. when the difference between voltages $V_{oa}$ and $V_{ob}$ exceeds the Zener voltage Vz of Zener diode D2, SCR Q1 starts conducting. However, conduction is still present when the gate signal ceases, and until the direct current falls below a minimal holding value (the so-called holding current). However, given that current $i_{114}$ is discontinuous, this take place at each pulse of current $i_{114}$.

As a consequence, when the difference between voltages $V_{oa}$ and $V_{ob}$ exceeds the Zener voltage Vz, SCR Q1 is closed via Zener diode D2 and current $i_{114}$ is transferred to capacitor Cb. Otherwise, current $i_{114}$ is transferred to capacitor Ca.

Therefore, Zener diode D2 performs the function of comparator 1162, and SCR Q1 directly implements components 1160, 1164, 1166 and 1168 of FIG. 9.

Figure 13:
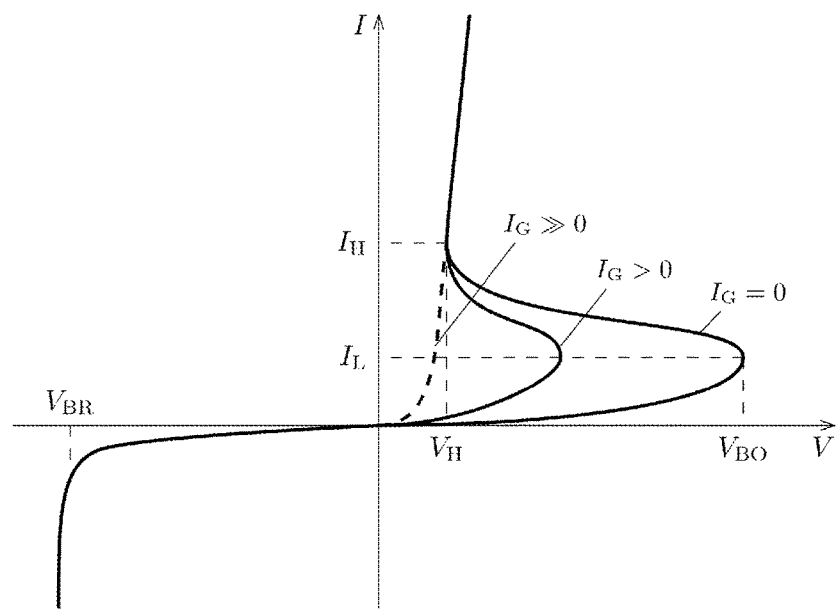
FIGS. 13 to 15 and 18 show details of embodiments of the electronic converter of FIG. 12.
Figure 14:
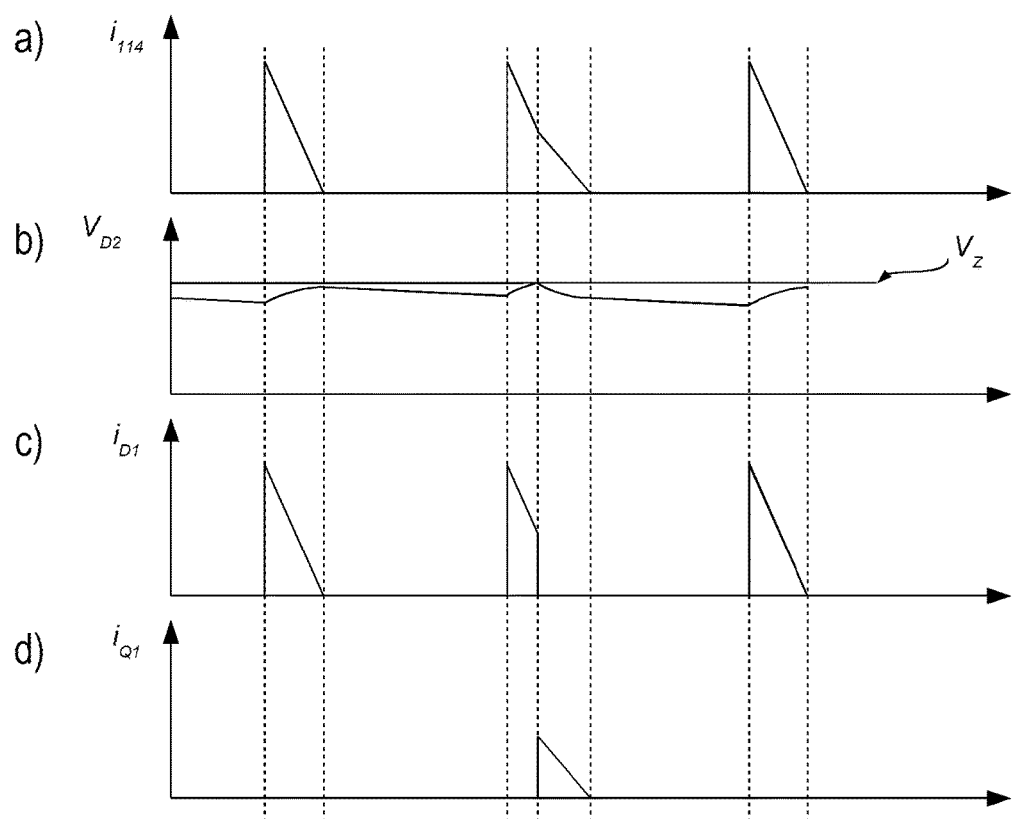
Figure 15:
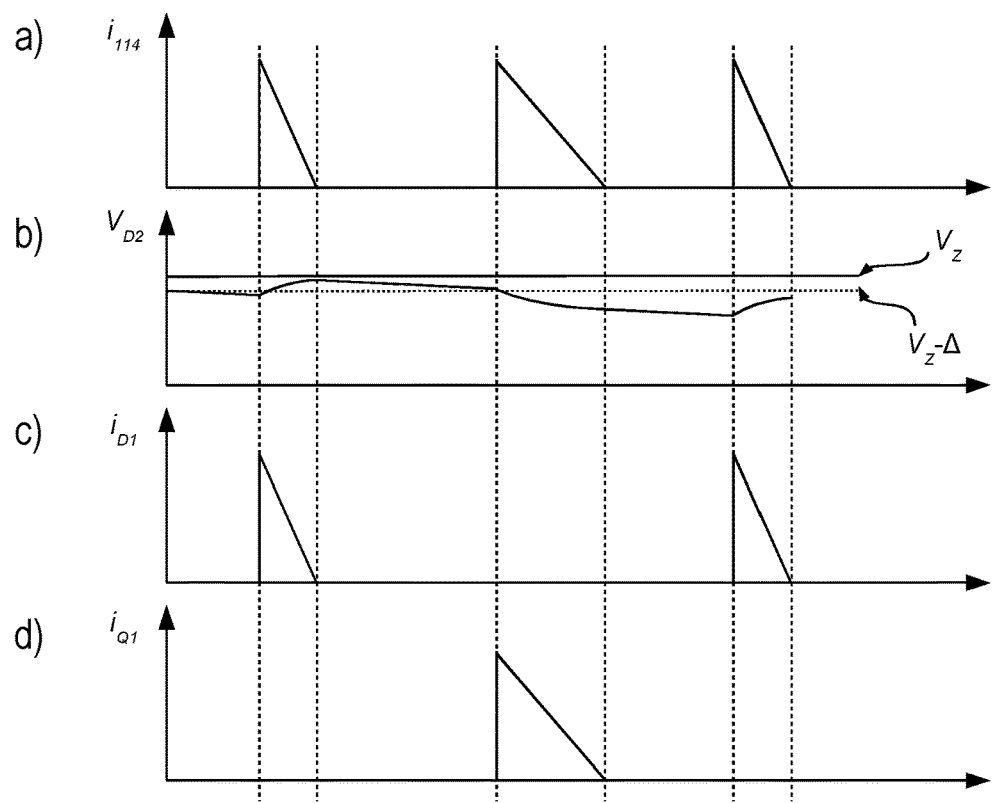

In this respect, FIG. 13 shows the typical diagram I-V of a SCR, as a function of current $I_G$ at the gate of the SCR.

Specifically, when directly conducting the SCR has the typical curve of a diode, provided that current $I_G$ reaches a sufficient value, i.e. $I_G \gg 0$. On the contrary, when current $I_G$ is smaller, i.e. $I_G>0$, the triggering takes place anyway, but with a greater voltage $V_{AK}$ between anode and cathode. In the most extreme of cases, with current $I_G$ equal to zero, the triggering takes place when voltage $V_{AK}$ between anode and cathode reaches breakdown voltage $V_{BO}$ of the SCR. Finally, the SCR may also be triggered when the critical rate of rise (dV/dt) is exceeded. As a matter of fact, if the applied voltage rises too rapidly, the SCR may start conducting automatically (so-called spontaneous triggering).

The triggering is maintained until the current flowing through the SCR falls below a holding value $I_H$ (holding current). As a consequence, there is no need for the current pulse to fall exactly to zero; on the contrary, it is sufficient for each pulse of current $i_{114}$ to include a portion wherein the current is smaller than holding value $I_H$ of SCR Q1.

On the basis of the features of SCR Q1, there are therefore two operating modes for circuit 116. In the former case, an initial part of a current pulse is transferred to the output having a greater voltage, e.g. output 106a, and when Zener diode D2 triggers SCR Q1, the second part of the current pulse is transferred to the output having a smaller voltage, e.g. output 106b. This operation corresponds therefore to the split pulse mode. On the contrary, in the latter case, SCR Q1 is activated via a spontaneous triggering. Therefore, in this case, each current pulse is transferred completely to one of the capacitors Ca or Cb. Therefore, this operation corresponds to the full pulse mode.

As previously explained, in split pulse mode, SCR Q1 is triggered only via the current at the gate of SCR Q1, i.e. triggering is not due to an excessive voltage $V_{AK}$ or an excessive voltage variation at the anode of SCR Q1.

For example, FIG. 14a shows a possible profile of current $i_{114}$, FIG. 14b shows voltage $V_{D2}$ across Zener diode D2, and FIGS. 14c and 14d respectively show current 1D1 flowing through diode D1, i.e. the current which charges capacitor Ca, and current $i_{Q1}$ flowing through SCR Q1, i.e. the current which charges capacitor Cb.

Specifically, there are shown three pulses for current $i_{114}$:
the first pulse is transferred completely to capacitor Ca, because voltage $V_{D2}$ across Zener diode D2 is smaller than voltage $V_Z$ of Zener diode D2;
during the second pulse, voltage $V_{D2}$ across Zener diode D2 reaches voltage $V_Z$ of Zener diode D2 and SCR Q1 is triggered, and from this moment on the current is transferred to capacitor Cb;
also the third pulse is transferred completely to capacitor Ca, because voltage $V_{D2}$ across Zener diode D2 is still smaller than voltage $V_Z$ of Zener diode D2.

Figure 10:
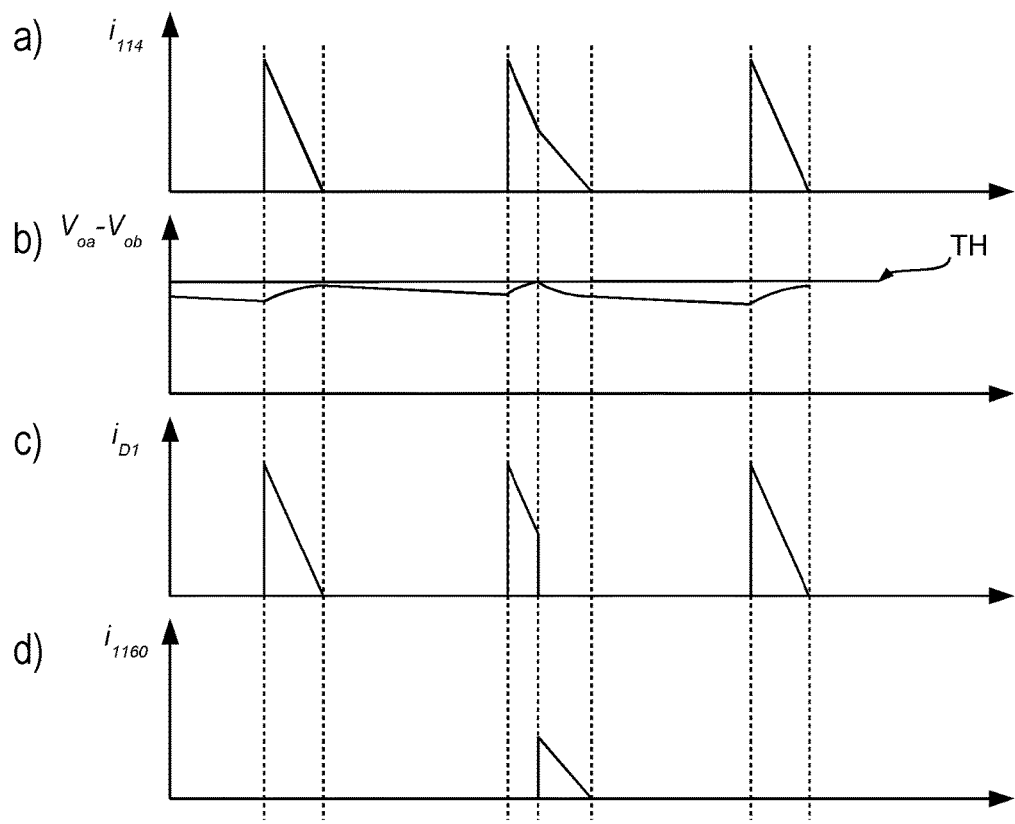

Therefore, the waveforms substantially correspond to what is shown with reference to FIG. 10.

On the other hand, in full pulse mode, SCR Q1 may be activated by a spontaneous triggering. The spontaneous triggering takes place when to the anode of the SCR a voltage variation is applied which exceeds the critical rate of rise of the SCR. Moreover, as shown in FIG. 13, triggering is more likely to occur if current $I_G$ at the gate of the SCR is not equal to zero, i.e. when the difference between $V_{oa}$ and $V_{ob}$ approaches the Zener voltage $V_Z$ of diode D2. Therefore, from a practical point of view, for a given variation of voltage dV/dt the triggering takes place at a voltage $V_z-\Delta$.

For example, FIG. 15a shows a possible profile of current $i_{114}$, FIG. 15b shows voltage $V_{D2}$ across Zener diode D2, and FIGS. 15c and 15d respectively show current $i_{D1}$ flowing through diode D1, i.e. the current which charges capacitor Ca, and current $i_{Q1}$ flowing through SCR Q1, i.e. the current which charges capacitor Cb.

Specifically, there are shown three pulses for current $i_{114}$:
the first pulse is transferred completely to capacitor Ca because, at the beginning of the pulse, voltage $V_{D2}$ across Zener diode D2 is smaller than voltage $V_z-\Delta$ and the voltage at Zener diode D2 does not reach Zener voltage $V_z$ during the pulse;
during the second pulse, voltage $V_{D2}$ across Zener diode D2 approaches voltage $V_Z$ of Zener diode D2, specifically it is greater than threshold $V_z-\Delta$, and as a consequence of an abrupt change of voltage at the anode of SCR Q1, SCR Q1 is triggered and the current is transferred to capacitor Cb only;
also the third pulse is transferred completely to capacitor Ca because, at the beginning of the pulse, voltage $V_{D2}$ across Zener diode D2 is smaller than voltage $V_z-\Delta$ and the voltage at Zener diode D2 does not reach Zener voltage $V_z$ during the pulse.

Figure 11:
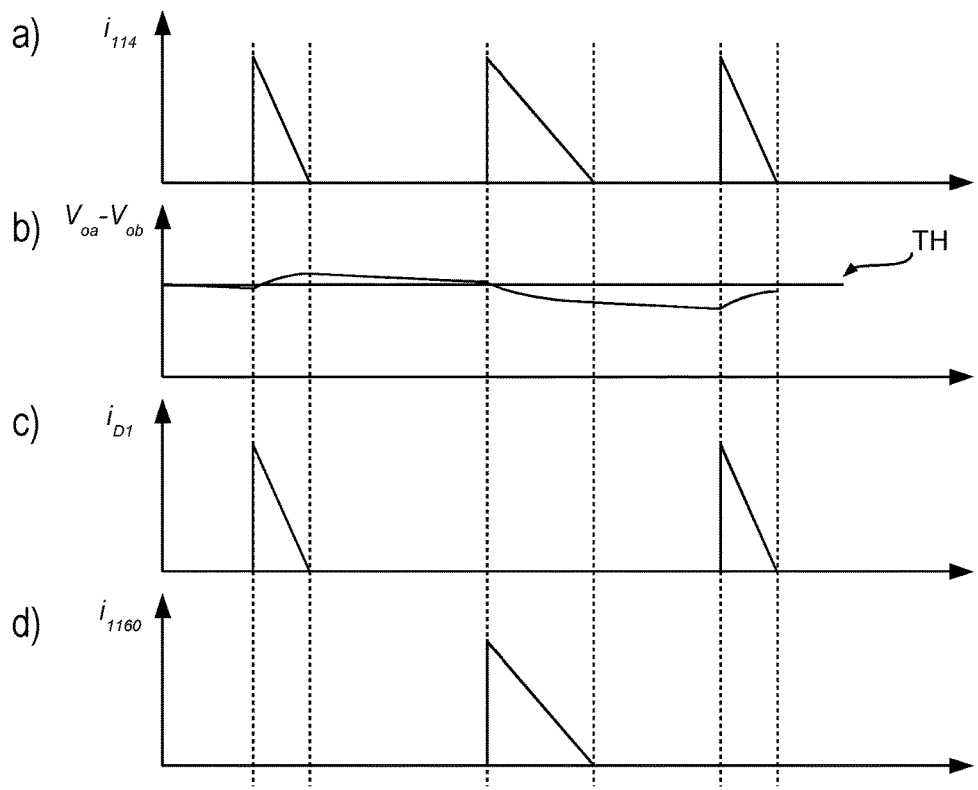

Therefore, the waveforms substantially correspond to what is shown with reference to FIG. 11.

In order to reduce the ripple in the output voltages, there may also be provided at least one interlink capacitor between the outputs.

Figure 16:
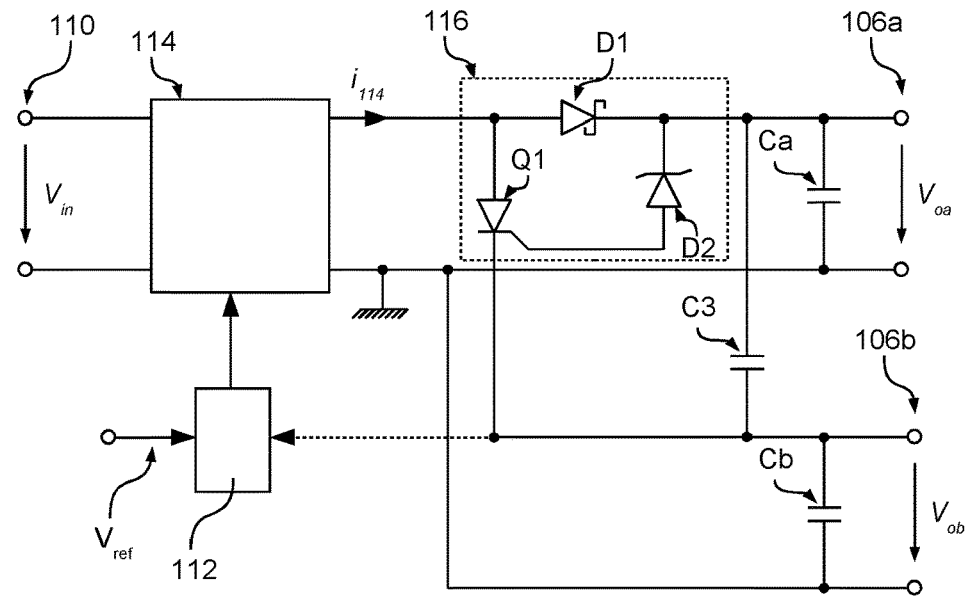
FIG. 16 shows a third embodiment of an electronic converter providing two voltages.

For example, FIG. 16 shows an embodiment having the addition of a capacitor C3, which is connected between the positive terminal of output 106a and the positive terminal of output 106b.

Such a capacitor C3 therefore performs a capacitive coupling, and therefore each pulse is also transferred partially to the other output. Moreover, capacitor C3 enables an improvement of the output voltage.

Therefore, such an interlink capacitor C3 is particularly useful for the Full Pulse Mode.

As previously stated, on the basis of the critical rate of rise (dV/dt) of SCR Q1, switching circuit 116 may behave in two ways.

Figure 17:
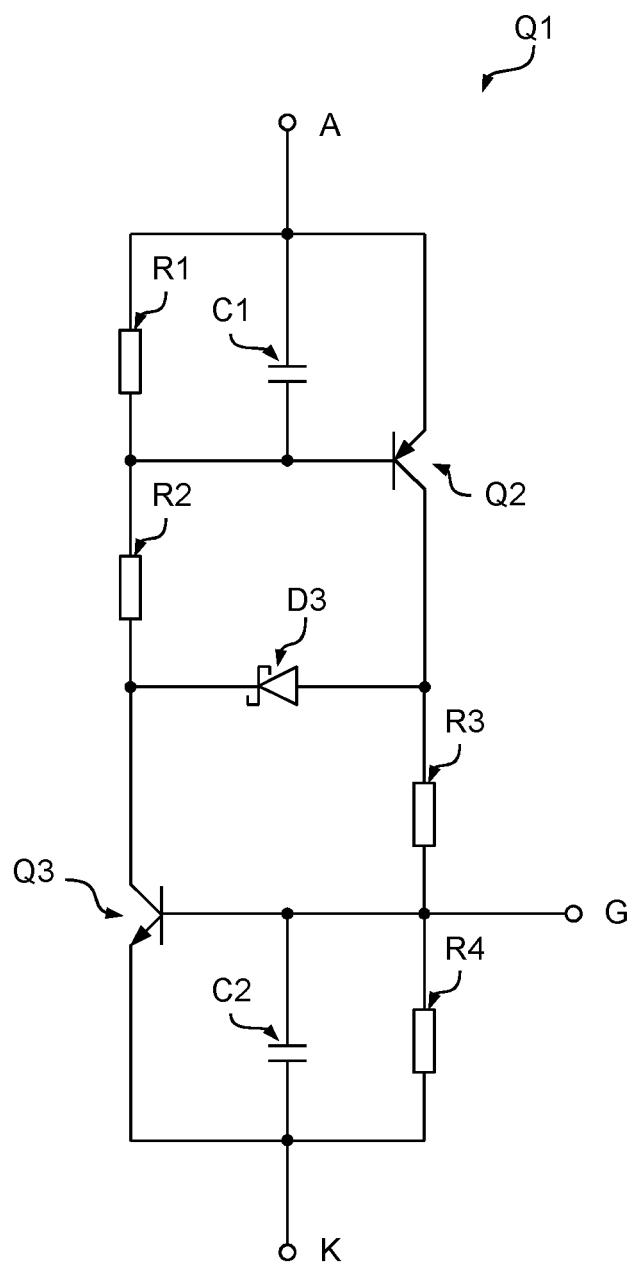
FIG. 17 shows a fourth embodiment of an electronic converter providing three voltages.

In this respect, FIG. 17 shows a possible embodiment of SCR Q1.

Substantially, an SCR consists in a structure of "pnpn" junctions, wherein:
the first "p" represents anode A;
the last "n" represents cathode C, and
the second "p" represents gate G.

Therefore, an SCR may be implemented via two bipolar transistors: a pnp bipolar transistor Q2 and an npn bipolar transistor Q3.

Specifically, the emitter of pnp transistor Q2 is connected (e.g. directly) to a terminal which represents anode A of SCR Q1. The base of pnp transistor Q2 is connected to the collector of npn transistor Q3. The collector of pnp transistor Q2 is connected to the base of npn transistor Q3, which is also connected to a terminal representing gate G of SCR Q1. Finally, the emitter of npn transistor Q3 is connected (e.g. directly) to a terminal representing cathode C of SCR Q1.

In various embodiments, the circuit may moreover comprise one or more capacitors connected to the bases of transistors Q2 and Q3, enabling the variation of the critical rate of rise dV/dt of SCR Q1. For example, in the presently considered embodiment, a first capacitor C1 is connected between the emitter of transistor Q2 and the base of transistor Q2, and a second capacitor C2 is connected between the base of transistor Q3 and the emitter of transistor Q3. For example, in an embodiment, such capacitors have a capacitance of a few nF, e.g. 1-10 nF, e.g. 4.7 nF.

The implementation may additionally include further components. For example, resistors R1 and R4 are provided which are respectively connected to the base of transistors Q2 and Q3. For example, resistor R1 is connected between the emitter of transistor Q2 and the base of transistor Q2, and resistor R4 may be connected between the base of transistor Q3 and the emitter of transistor Q3. The circuit moreover may comprise a resistor R2, connected between the base of transistor Q2 and the collector of transistor Q3, and a resistor R3 connected between the collector of transistor Q2 and the base of transistor Q3.

In various embodiments, the collector of transistor Q2 is also connected to the collector of transistor Q3 via a diode D3, such as e.g. a Schottky diode. Substantially, diode D3 induces most of the current input by emitters to circulate in the collectors and not in the bases. This is due to the fact that BJTs are designed to withstand a base current smaller than the collector current, and a damage would occur without the provision of D3, because the collector currents would equal the base currents. In this way, on the contrary, the base current is limited, also by splitters R1&R2 and R3&R4, so that Vf on the diode with the addition of the diode saturation voltage keeps the arrangement triggered in any case. R2 and R3 have a low value, of around ten Ohm or less, while R1 and R4 determine the triggering current and amount to a few kOhm.

The number of outputs may also be increased, by providing a respective circuit 116 for each output.

Figure 18:
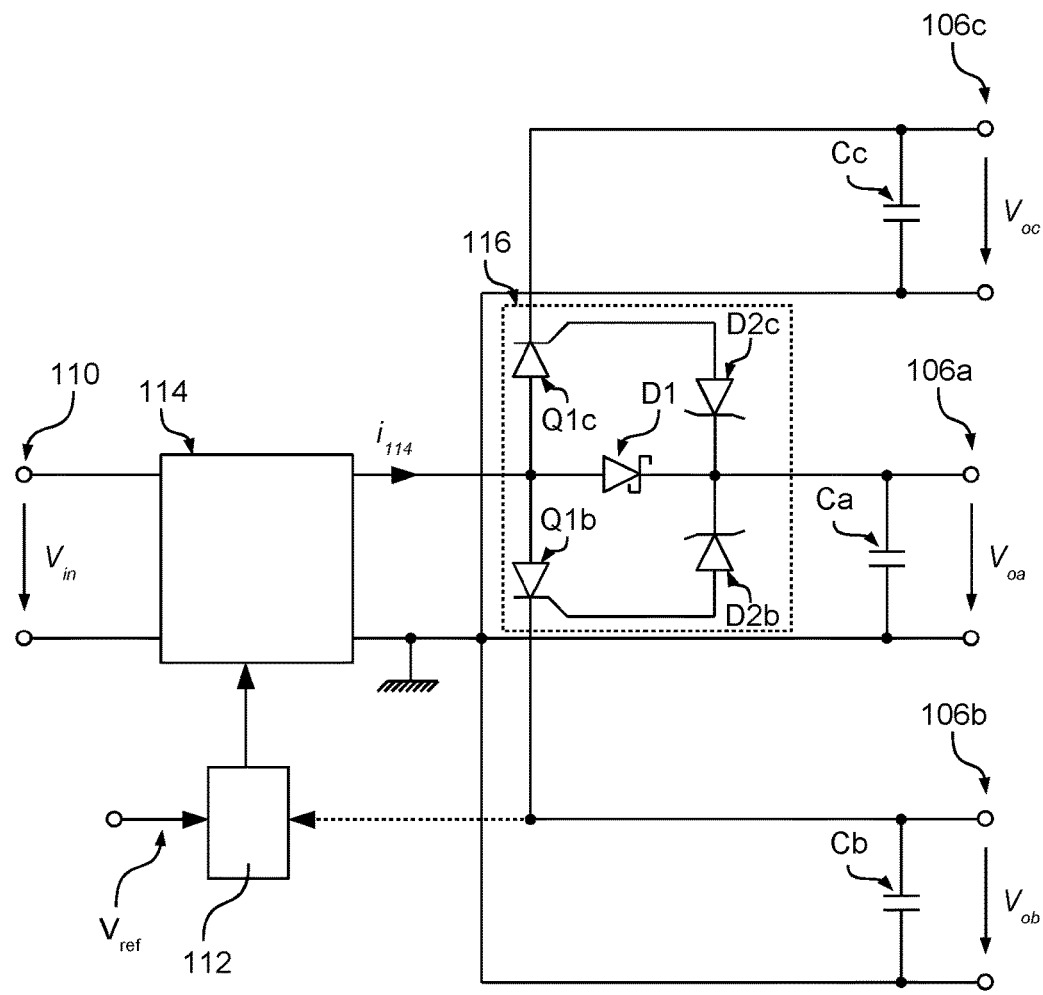

For example, FIG. 18 shows a possible embodiment with three outputs 106a, 106b and 106c, wherein a respective output capacitor Ca, Cb and Cc is associated to each output.

Therefore, switching means 116 include a diode for the output with the highest voltage 106a, and for the remaining two outputs respectively an SCR Q1b and Q1c and a Zener diode D2b and D2c, wherein Zener voltage $V_z$ of the respective diode substantially corresponds to the difference between the highest voltage and the desired voltage.

Specifically, the terminal providing current $i_{114}$ is connected via SCR Q1b to output capacitor Cb associated to output 106b, and the gate of SCR Q1b is connected via Zener diode D2b to the positive terminal of capacitor Ca associated to output 106a. Similarly, the terminal providing current $i_{114}$ is connected via SCR Q1c to output capacitor Cc associated to output 106c and the gate of SCR Q1c is connected via Zener diode D2c to the positive terminal of capacitor Ca associated to output 106a.

Of course, without prejudice to the principle of the invention, the details and the embodiments may vary, even appreciably, with respect to what has been described herein by way of non-limiting example only, without departing from the extent of protection of the invention as defined by the annexed claims.

While the invention has been particularly shown and described with reference to specific embodiments, it should be understood by those skilled in the art that various changed in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An electronic converter comprising:
 a switching stage comprising at least one electronic switch, wherein said
 switching stage is adapted to provide current pulses via a terminal;
 a first capacitor, wherein said first capacitor provides a first voltage,
 a second capacitor, wherein said second capacitor provides a second voltage,
 a switching means configured to transfer selectively said current to said first capacitor or said second capacitor, wherein the switching means comprises:
  a current sensor configured to detect a value identifying said current;
  a detection circuit configured to determine a signal which indicates whether said detected current is equal to zero;
  wherein said switching means is configured to transfer selectively said current to said first capacitor or said second capacitor as a function of said signal which indicates whether said detected current is equal to zero;
 a driver circuit configured to drive said switching stage as a function of either said voltage at said first capacitor or the voltage at said second capacitor, and
 a comparison means configured to detect the difference between said first voltage and said second voltage, and determine a comparison signal which indicates whether said difference is greater than a threshold, wherein said switching means are configured to transfer selectively said current to said first capacitor or said second capacitor as a function of said comparison signal.

2. The electronic converter according to claim 1, wherein said comparison means comprise a comparator.

3. The electronic converter according to claim 2, wherein said comparator is a comparator with hysteresis, or a Zener diode.

4. The electronic converter according to claim 1, wherein said switching means comprise:
 a diode, connected between said terminal which provides said current and said first capacitor, and
 an electronic switch connected between said terminal which provides said current and said second capacitor.

5. The electronic converter according to claim 4, wherein said diode is a Schottky diode.

6. The electronic converter according to claim 1, wherein said switching means comprise a latch, wherein:
 when said comparison signal indicates that said difference is smaller than said threshold, a current pulse is transferred completely to said first capacitor; and when said comparison signal indicates that said difference is greater than said threshold, a current pulse is transferred completely to said second capacitor.

7. The electronic converter according to claim 1, wherein said switching means comprise:
 a SCR, wherein the anode of said SCR is connected to said terminal which provides current pulses, and wherein the cathode of said SCR is connected to said second capacitor.

8. The electronic converter according to claim 7, wherein said switching means comprise:
 a Zener diode, wherein the cathode of said Zener diode is connected to said first capacitor and the anode of said Zener diode is connected to the gate of said SCR.

9. The electronic converter according to claim 7, wherein said SCR has a low critical rate of rise, such that each current pulse is transferred completely to said first capacitor or to said second capacitor.

10. The electronic converter according to claim 7, wherein said SCR is implemented by means of a pnp bipolar transistor and a npn bipolar transistor, wherein said pnp bipolar transistor and/or said npn bipolar transistor have an associated respective capacitor for varying said critical rate of rise.

11. The electronic converter according to claim 1, wherein:
said switching stage is a buck converter operated in DCM mode, or
said switching stage is a boost or flyback converter comprising a rectification diode, and wherein said diode is implemented with said rectification diode.

12. A method for operating an electronic converter the electronic converter comprising:
a switching stage comprising at least one electronic switch, wherein said switching stage is adapted to provide current pulses via a terminal;
a first capacitor, wherein said first capacitor provides a first voltage,
a second capacitor, wherein said second capacitor provides a second voltage,
a switching means configured to transfer selectively said current to said first capacitor or said second capacitor, wherein the switching means comprises:
a current sensor configured to detect a value identifying said current:
a detection circuit configured to determine a signal which indicates whether said detected current is equal to zero;
wherein said switching means are configured to transfer selectively said current to said first capacitor or said second capacitor as a function of said signal which indicates whether said detected current is equal to zero;
a driver circuit configured to drive said switching stage as a function of either said voltage at said first capacitor or the voltage at said second capacitor, and
a comparison means configured to detect the difference between said first voltage and said second voltage, and determine a comparison signal which indicates whether said difference is greater than a threshold, wherein said switching means are configured to transfer selectively said current to said first capacitor or said second capacitor as a function of said comparison signal;
the method comprising the steps of:
detecting the difference between said first voltage and said second voltage,
determining a comparison signal which indicated whether said difference is greater than a threshold, and
transferring selectively said current to said first capacitor or said second capacitor as a function of said comparison signal.

* * * * *